United States Patent
Yücesan

(10) Patent No.: US 10,473,165 B2
(45) Date of Patent: Nov. 12, 2019

(54) SELF-ADJUSTING CLUTCH

(71) Applicant: MA-PA MAKINA PARÇALARI ENDÜSTRISI A.S., Kocaeli (TR)

(72) Inventor: Alişan Yücesan, Istanbul (TR)

(73) Assignee: MA-PA MAKINA PARÇALARI ENDÜSTRISI A.S., Cayirova, Kocaeli (TR)

( * ) Notice: Subject to any disclaimer, the term of this patent is extended or adjusted under 35 U.S.C. 154(b) by 0 days.

(21) Appl. No.: 15/520,144

(22) PCT Filed: Apr. 17, 2015

(86) PCT No.: PCT/TR2015/000160
§ 371 (c)(1),
(2) Date: Apr. 19, 2017

(87) PCT Pub. No.: WO2016/068817
PCT Pub. Date: May 6, 2016

(65) Prior Publication Data
US 2017/0307027 A1    Oct. 26, 2017

(30) Foreign Application Priority Data

Oct. 27, 2014 (TR) .................. 2014 12615

(51) Int. Cl.
| F16D 13/75 | (2006.01) |
| F16D 13/58 | (2006.01) |
| F16D 13/70 | (2006.01) |
| F16D 15/00 | (2006.01) |

(52) U.S. Cl.
CPC ......... F16D 13/757 (2013.01); F16D 13/585 (2013.01); F16D 13/70 (2013.01); F16D 15/00 (2013.01)

(58) Field of Classification Search
CPC ...... F16D 13/757; F16D 13/585; F16D 13/70; F16D 15/00; F16D 13/75
See application file for complete search history.

(56) References Cited

U.S. PATENT DOCUMENTS

| 4,189,043 A * | 2/1980 | Steinhagen ........... F16D 13/757 188/196 BA |
| 5,069,322 A | 12/1991 | Mizukami et al. |
| 6,029,787 A | 2/2000 | Reik et al. |
| 2003/0141163 A1 | 7/2003 | Doremus et al. |

FOREIGN PATENT DOCUMENTS

FR    2750467 A1    1/1998

OTHER PUBLICATIONS

International Search Report for corresponding International Application No. PCT/TR2015/000160.

* cited by examiner

*Primary Examiner* — Jacob S. Scott
*Assistant Examiner* — Lori Wu

(57) ABSTRACT

A self-adjusting clutch mechanism has a pressure plate, a wear compensation plate, a wear sensor adjusting plate, a wear sensor, a clutch cover, a first screw thread, and a second screw thread. The mechanism on the clutch pressure plate can keep clutch pedal load and clutch clamp load constant.

1 Claim, 4 Drawing Sheets

SELF-ADJUSTING CLUTCH

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The invention is related to the mechanism in the clutch pressure plate keeping both the clutch pedal load and the clutch clamp load constant.

2. Description of Related Art Including Information Disclosed Under 37 CFR 1.97 and 37 CFR 1.98

Clutch pedal load and clutch clamp load change due to wear in the clutch disc facings if the clutch pressure plate does not include an automated adjusting mechanism to keep the diaphragm spring working position stable.

Clutch pedal load gradually increases as long as the diaphragm spring working position varies due to the wear of the facings and may reach a load level affecting driver comfort. In addition, the clutch clamp load changes over time and the clutch becomes unusable if the load decreases below the minimum clamp load value needed for engagement.

BRIEF SUMMARY OF THE INVENTION

In the present invention, the clutch clamp load value is kept constant as it is not as dependent on wear of the clutch disc facings. Additionally, driver comfort is ensured by the invention as the clutch pedal load remains constant even if facings continue to wear. The invention compensates for facing wear, therefore the clutch pressure plate also has a longer lifetime with same characteristics.

The present invention has a self-adjusting mechanism in the clutch pressure plate. The facings of the clutch disc are worn over time due to engagement and consequently their thicknesses decrease. The pressure plate is displaced a distance equal to the total wear in thickness towards the clutch disc. This displacement of the pressure plate alters the working position of the diaphragm spring causes a change in the clutch clamp load and clutch pedal load. The mechanism of the present invention compensates for the value of the facing wear to ensure that the diaphragm spring maintains its initial working position.

BRIEF DESCRIPTION OF THE SEVERAL VIEWS OF THE DRAWINGS

FIG. (1) Self-Adjusting Clutch Section-1
FIG. (2) Self-Adjusting Clutch Section-2
FIG. (3) is another sectional view illustrating the rollers of the Self-Adjusting Clutch
FIG. (4) is an isolated view illustrating the screw threads
FIG. (5) illustrates Wear Compensation Plate
FIG. (6) illustrates the Wear Sensor Adjusting Plate
FIG. (7) illustrates the Wear Sensor Adjusting Distance
FIG. (8) is a first view of the Pressure Plate with Self-Adjusting Mechanism
FIG. (9) is a second view of the Pressure Plate with Self-Adjusting Mechanism

INDEX EXPLANATIONS INDICATED IN FIGURES (1) Pressure Plate
(2) Wear Compensation Plate
(3) Wear Sensor Adjusting Plate
(4) Wear Sensor
(5) Adjustment Roller
(6) Mechanism Cover
(7) Diaphragm Spring
(8) Clutch Cover
(9) Strap
(10) Disc Spring
(11) Clutch Cover Lug
(12) Screw Thread-1
(13) Screw Thread-2
(14) Wear Sensor Adjusting Distance

DETAILED DESCRIPTION OF THE INVENTION

Figure 1:
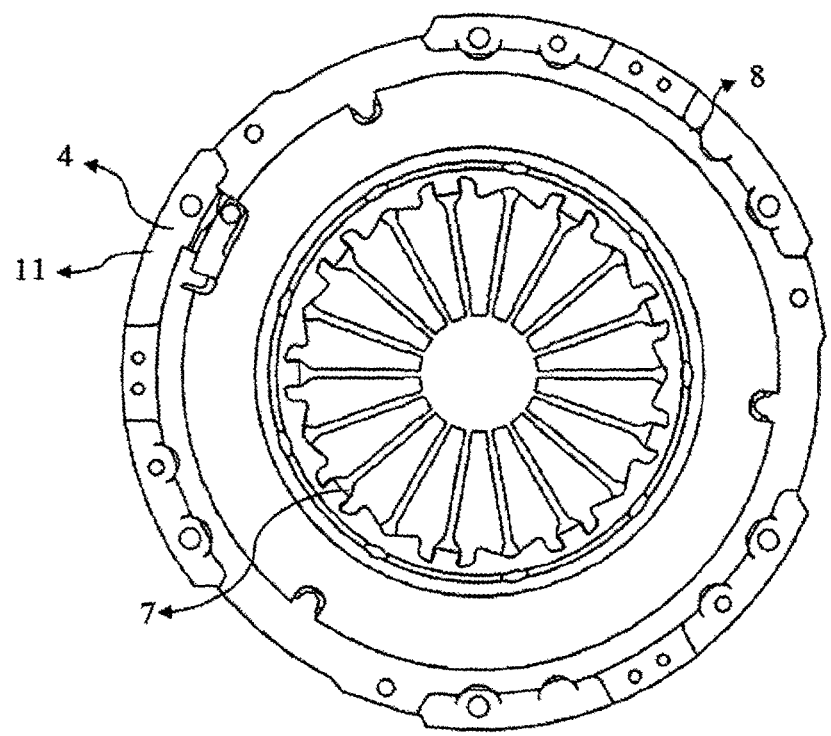
Figure 2:
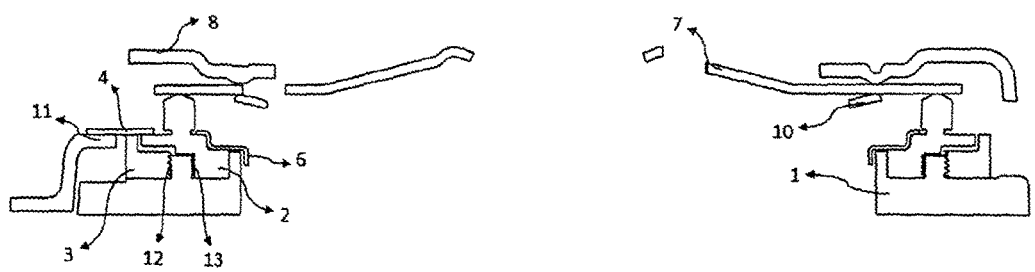
Figure 3:
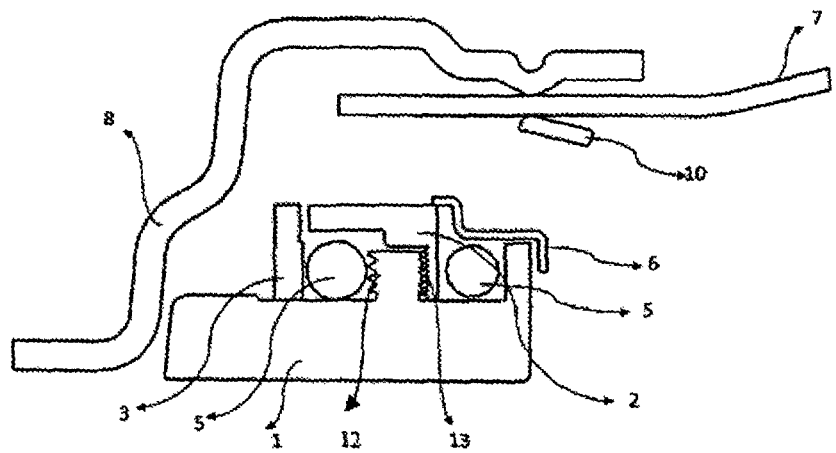
Figure 4:
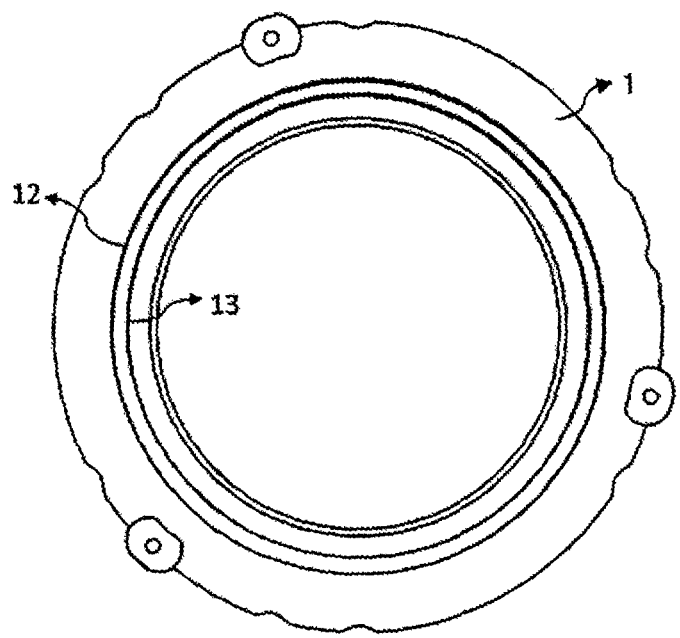
Figure 5:
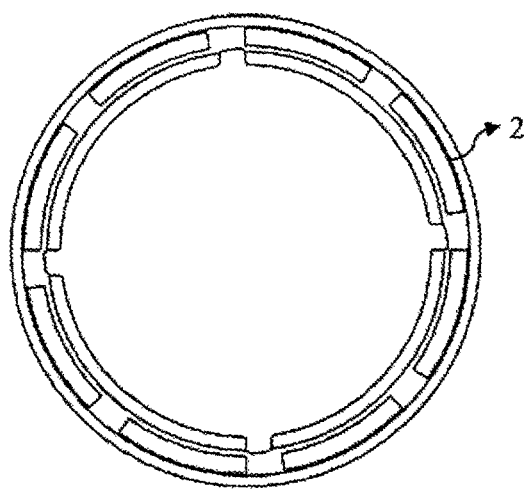
Figure 6:
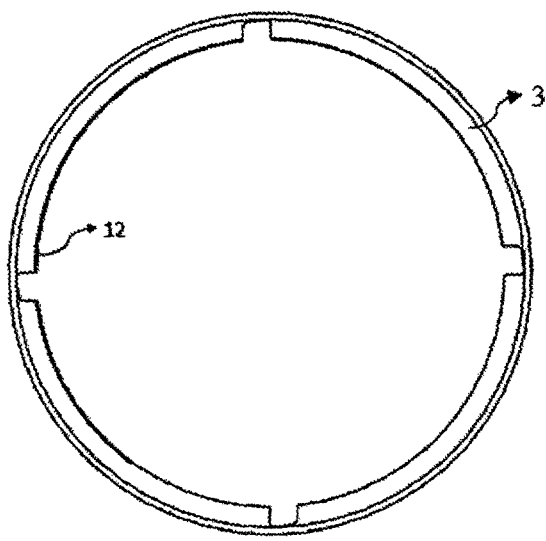
Figure 7:
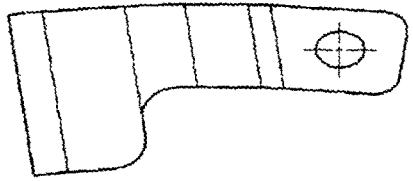
Figure 7:
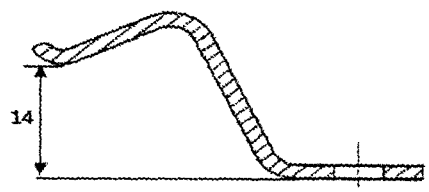
Figure 8:
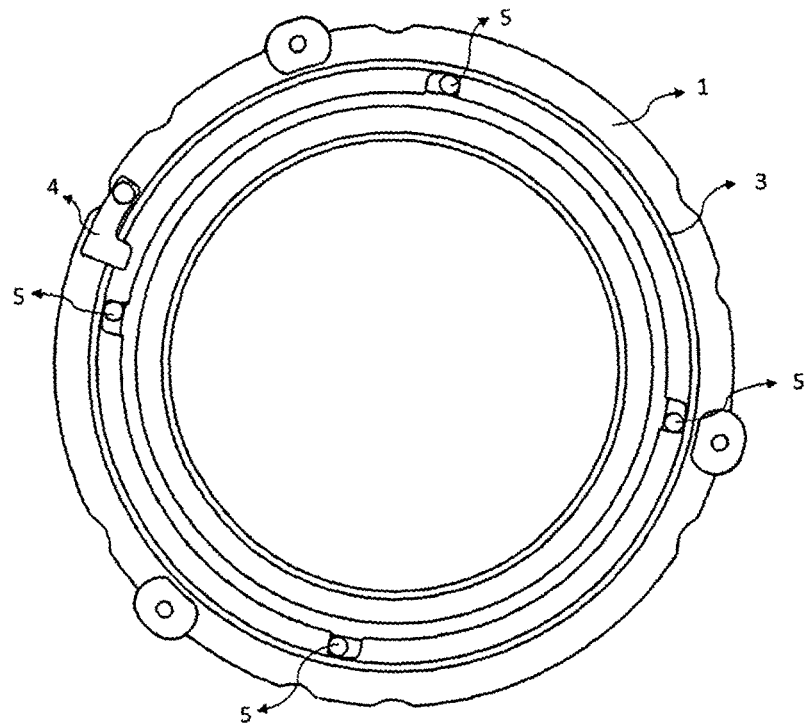
Figure 9:
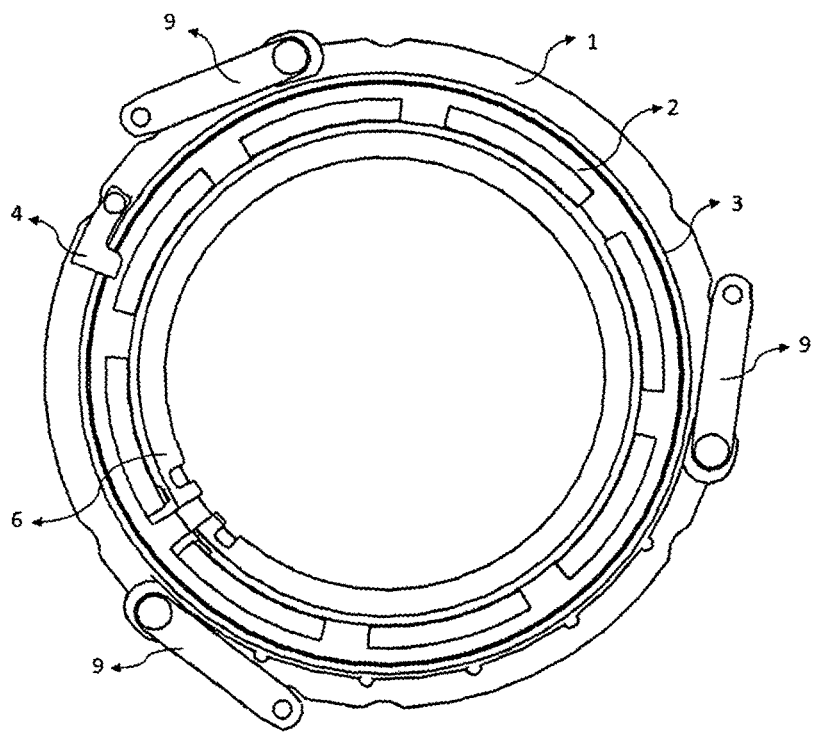

Having rotational kinetic energy to compel the plates to move via a screw thread is the key principle for the present invention. The rotations transmitted from engine crankshaft to the flywheel load the rotational kinetic energy to the wear compensation plate (2) and the wear sensor adjusting plate (3) to move via their screw threads (12), (13) in order to compensate for the amount the wear sensor (4) detects. The mechanism works as described below.

The wear sensor (4) is mounted on the pressure plate (1) from its mounting surface and in contact with the wear compensation plate (2), wear sensor adjusting plate (3) and clutch cover lug (11) from its contact surface. If the thickness of the facing decreases, the pressure plate moves towards the clutch disc. The wear sensor (4) also moves with the pressure plate (1) while its contact surface keeps in contact with the clutch cover (8) lug (11), such that the distance (14) between wear sensor contact surface and its mounting surface increases as much as the total decrement in the facing's thickness. This movement creates a gap, equal to the total decrement in the facing thickness, between the wear sensor contact surface and, both wear compensation plate (2) and wear sensor adjusting plate (3).

In this new position, the wear sensor adjusting plate (3) can start to relatively rotate by its kinetic energy depending on the change in engine speed and it moves up by relatively rotating around the pressure plate (1) via its screw thread (12) until re-setting contact again with the wear sensor surface to stop relative rotation. With this re-contact, the wear sensor (4) is adjusted in the new-distance (14) position. The rollers (5) provide one way rotation for the wear sensor adjusting plate (3) by preventing movement in the opposite direction. Wear compensation plate (2) maintains its initial position while being under diaphragm spring (7) force.

When the diaphragm spring (7) is moved by a clutch bearing for the disengagement process, the force applied by the diaphragm spring (7) on the wear compensation plate (2) begins to fade away and the wear compensation plate (2) starts to relatively rotate by its kinetic energy depending on the change in engine speed and it moves up by relatively rotating around the pressure plate (1) via its screw thread (13) until re-setting contact again with the wear sensor surface to stop relative rotation. With this re-contact, wear sensor adjusting plate (3) compensates for the total decrement in the thickness of clutch disc's facings. The rollers (5) provide one way rotation for the wear compensation plate (2) by preventing movement in the opposite direction. The diaphragm spring (7) is adjusted to its initial working position and the compensation-adjusting process is completed by the end of this movement.

The invention claimed is:

1. A self-adjusting mechanism for use with an engine comprising:
   a pressure plate;
   a wear compensation plate;
   a wear sensor adjusting plate;
   a wear sensor mounted on a surface of said pressure plate and in contact with said wear compensation plate and said wear sensor adjusting plate, said wear sensor being movable with said pressure plate, said wear sensor adjusting plate and said wear compensation plate are each rotatable by kinetic energy relative to a change in a speed of the engine and moves away from the pressure plate by rotating around and relative to said pressure plate via a first screw thread and a second screw thread respectively, said wear sensor adjustment plate stopping rotation upon contact with a surface of said wear sensor;
   a plurality of adjustment rollers cooperative with said wear sensor adjustment plate so as to provide a unidirectional rotation for said wear sensor adjustment plate and to prevent rotation in an opposite direction; and
   a diaphragm spring urging a force against said wear compensation plate so as to maintain an initial position of said wear compensation plate, said diaphragm spring adapted to release the force on said wear compensation plate; and
   a clutch cover lug in contact with the surface of said wear sensor.

* * * * *